F. KIMCHE.
PIPE FITTING.
APPLICATION FILED SEPT. 21, 1907.
899,221. Patented Sept. 22, 1908.
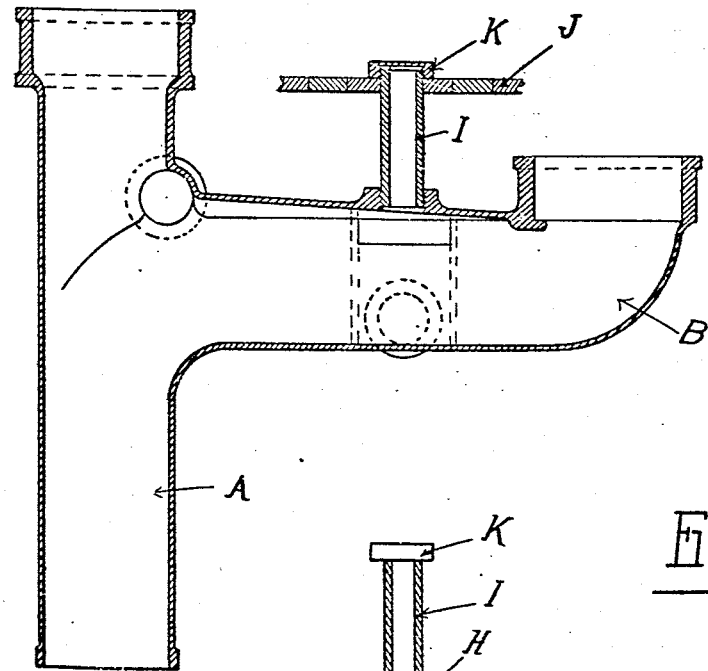
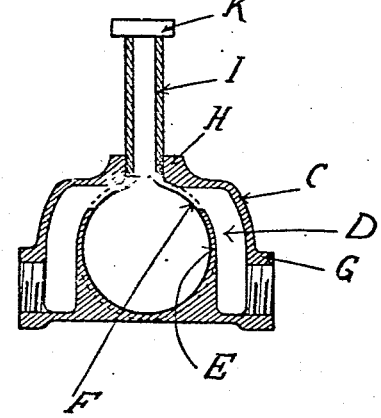
WITNESSES
INVENTOR
FISEL KIMCHE

UNITED STATES PATENT OFFICE.

FISEL KIMCHE, OF DETROIT, MICHIGAN.

PIPE-FITTING.

No. 899,221.

Specification of Letters Patent.

Patented Sept. 22, 1908.

Application filed September 21, 1907. Serial No. 393,897.

*To all whom it may concern:*

Be it known that I, FISEL KIMCHE, a citizen of the United States of America, residing at Detroit, in the county of Wayne and State of Michigan, have invented certain new and useful Improvements in Pipe-Fittings, of which the following is a specification, reference being had therein to the accompanying drawings.

The invention relates to pipe fittings more particularly designed for the waste connections for bath rooms, and the invention consists in certain novel features of construction as hereinafter set forth.

In the drawings—Figure 1 is a vertical longitudinal section through the fitting; and Fig. 2 is a cross section thereof.

My improvement is particularly applicable to a type of fitting which has heretofore been employed for the soil pipe and other waste connections from a bath room. This fitting is of a tee-shaped form and, as shown in Fig. 1, has a vertical portion A for a connection into the stand pipe and a horizontal arm B integral therewith, which leads to the closet, and to which the bathtub and washstand connections are made, these connections entering the arm B laterally.

It is the object of the present invention to so form the fitting that the lateral connections therewith are provided with a trap, and at the same time to provide means of access to this trap should any clogging occur therein. This is accomplished by forming upon one or both sides of the arm B the lateral enlargements C, forming therein a chamber D. This chamber is separated by the wall E of the arm B from the main passage through said arm, being only connected at a point F near the top of the fitting. The waste pipes are connected to the chamber D by engagement with nipples G at the lower end of the lateral enlargement C and thus the water entering through such connection into the arm B must pass upward through the chamber D and then laterally through the opening F. This forms a trap of the chamber D, which is normally filled with water.

To provide access to the trap, the arm B is provided on its upper side with a nipple H, to which is attached a vertical pipe I rising above the floor line, as indicated by the dotted line J, Fig. 1. The upper end of the pipe I is provided with a cap K for normally closing the same. This cap may, however, be removed at any time, and will then provide access to the traps through the pipe I, permitting of the insertion of a suitable instrument for clearing the trap when necessary.

What I claim as my invention is:

1. A pipe fitting comprising a laterally-extending conduit, an enlargement on the side of said conduit forming a chamber communicating with the interior of said conduit only at the top thereof, and a nipple at the lower end of said chamber for connecting the waste pipe therewith.

2. A pipe fitting comprising a laterally-extending conduit, an enlargement at the side of said conduit forming a chamber communicating with the interior of said conduit only at the top thereof, means for attaching the waste connection to the lower end of said enlargement, and means at the top of said conduit for providing access to said chamber.

3. A pipe fitting comprising a laterally-extending conduit, an enlargement at the side thereof forming a chamber communicating with the interior of said conduit only at the top thereof, and a capped vertically-extending pipe rising from the top of said conduit and forming means of access to said chamber.

4. A pipe fitting comprising a laterally-extending conduit, enlargements upon opposite sides of said conduit forming chambers communicating with the interior of said conduit only at the top portion thereof, waste connections to the lower portions of the respective chambers, a vertical capped pipe engaging an aperture in the top of said conduit in the plane of said lateral enlargements, for the purpose described.

5. A pipe fitting comprising a laterally extending conduit, an enlargement at the side thereof forming a chamber communicating with the interior of said conduit only at the top thereof, a nipple in the top of said conduit, and a capped vertically extending pipe engaging said nipple and forming means of access to said chamber.

In testimony whereof I affix my signature in presence of two witnesses.

FISEL KIMCHE.

Witnesses:
 NELLIE KINSELLA,
 JAMES P. BARRY.